May 22, 1928.

R. B. WILLIAMSON

BEARING

Filed April 17, 1922

1,671,056

Inventor:
R. B. Williamson
by
Attorney

Patented May 22, 1928.

1,671,056

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

BEARING.

Application filed April 17, 1922. Serial No. 553,556.

This invention relates in general to bearings and is particularly related to bearings of the thrust type, especially where the latter are used on vertical shaft machines.

In thrust bearings, especially types wherein provisions are made for deflection or tilting of one or more portions of the active bearing elements so as to provide for lubrication of the active bearing surfaces by means of wedge-shaped films of oil under pressure, the oil in the space between the inner periphery of the active bearing elements and the oil-retaining or guard sleeve or dam, is set in motion, primarily a swirling one, by the rotating parts. When this swirling motion of the oil is considerable, as when the bearing and shaft are operating at relatively high speeds and especially when one or more of the active bearing elements is in the form of a plurality of shoes or segmental portions, this swirling oil strikes projections or obstructions at the inner side of the active bearing elements and is thus agitated and deflected to a greater or less extent. When the speed is sufficiently high, this oil may be deflected upwardly in a vertical bearing to a sufficient extent to permit it to pass over the top of the stationary retaining or guard sleeve. Again, it may happen that the inner periphery of the rotatable element of the bearing is not wholly concentric with respect to the outer surface of the stationary oil retaining sleeve or dam provided at the inner side of the bearing; and when the shaft and its bearing are in operation, this rotatable eccentric element acts, in connection with the oil-retaining sleeve, as a rotary pump and thus disturbs and agitates the oil to a greater or less degree.

In case either of these conditions exists, the disturbance or agitation of the oil, when the shaft and the rotatable element of the bearing are operating at a relatively high speed, may be such as to splash or throw a portion of the oil upwardly and over the top of the retaining sleeve. A continuance of this effect will soon produce lowering of the oil level in the reservoir formed by the retaining sleeve and the bearing housing to a point where there is great danger of the insufficient lubrication of the active bearing surfaces of the relatively rotatable parts of the bearing, with the consequent danger of burning out or other injury to these bearing elements and the resultant shutting down of the machine for repairs.

The present invention contemplates a modification of the present known construction of thrust bearings to the extent of eliminating this danger of undue lowering of the level of lubricating material in the casing or housing in which the active bearing elements are disposed.

It is an object of the present invention to provide an improved bearing construction embodying means for preventing undue passage of oil from the reservoir associated with the active bearing surfaces of the bearing elements, during operation of the bearing and its associated shaft.

It is a further object of this invention to provide an improved form of thrust bearing embodying an oil retaining dam at the inner side of the bearing and means effective to prevent oil from splashing over the dam during operation of the bearing and its associated shaft.

It is a further object of this invention to provide an improved form of thrust bearing embodying an oil retaining dam at the radially inner side of the bearing and means for preventing splashing over of oil from the bearing housing to the space radially within the dam, and without substantially interfering with the ordinary and desired facility in assembling and disassembling the parts of the bearing structure.

These and other objects and advantages are secured by this invention, the various novel features of which will be apparent from the description and drawing, disclosing one embodiment of such invention, and will be more particularly pointed out in the claims.

Figure 1:
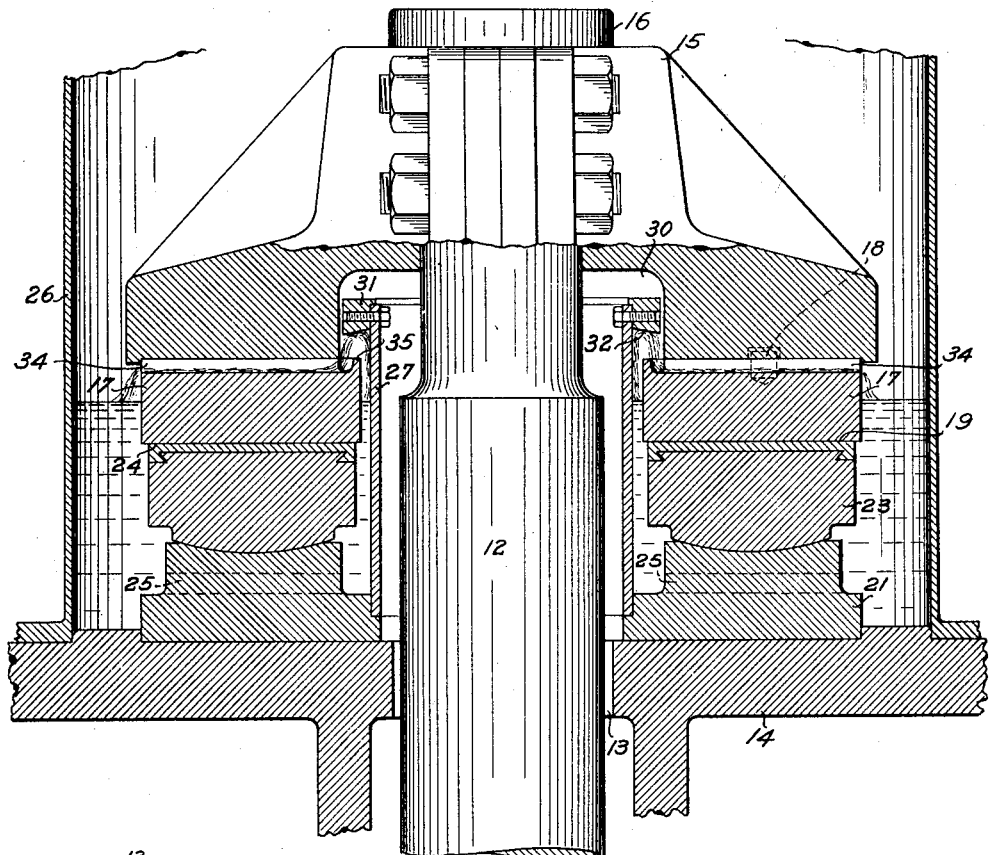
Fig. 1 is a fragmental vertical sectional elevation showing parts of a bearing construction embodying features of this invention.

In the embodiment of the invention disclosed in Fig. 1, the shaft 12 may be considered as that of a vertical shaft machine of any desired character wherein the thrust bearing is located at the upper side of the machine; and this shaft passes through a central opening 13 in a support 14 for the bearing and its housing. An annular support or thrust collar 15, preferably in the form of a split collar as shown herein, is secured in operative position on the shaft 12 against a shoulder 16 on the shaft. The member 15 carries on its under side or is supported on an annular bearing element 17, preferably in the form of a one-piece collar, being secured in fixed relation thereto, as by means of a dowel pin attached to the collar 15 and disposed within a slot in the bearing element 17, as indicated at 18. The under side of the annular bearing element 17 is arranged to provide a desired annular bearing surface 19.

An annular supporting element 21 may be mounted directly upon the bearing support 14 and held against appreciable movement relative thereto in any desired manner. An annular bearing element 23 of any suitable form, preferably in the form of a plurality of separate shoes pivotally or tiltably mounted upon the supporting element 21, as by means of spherical bearing surfaces on the shoes cooperative with similarly formed surfaces on the supporting element 21, is carried by the bearing support 21. The bearing element 23 may be provided at its upper side with a bearing face 24 on the bearing element 23, itself, or the individual shoes thereof, or in the form of a separate bearing face of suitable anti-friction material provided upon such shoes or element. The annular supporting element 21 is provided with a plurality of radial grooves 25 which permit communication between the space radially outside of the active bearing elements and the space radially within the same.

The housing 26 is supported upon the bearing support 14 in spaced relation to the active bearing elements; and an oil-retaining dam or guard, in the form of a sleeve 27, is secured to the support 14 or the supporting element 21, as shown, in fluid tight relation thereto, so as to provide a space radially within the active bearing elements. This sleeve 27 extends upwardly to a point beyond the cooperative bearing surfaces of the relatively movable bearing elements. A chamber is thus formed by the housing 26, sleeve 27 and the supporting elements 14 and 21, and this chamber may be filled with oil to a level appreciably above the cooperative bearing surfaces of the relatively movable parts of the bearing and somewhat below the upper end of the sleeve 27, as indicated. It will be apparent that a normal circulation of oil is permitted inwardly through the radial slots 25 in the supporting element 21, and outwardly or across the bearing faces of the cooperative bearing elements.

During operation of the bearing described hereinabove, the rotation of the upper bearing element causes swirling of the oil in the space between the active bearing elements and the sleeve 27, a portion of this swirling oil being thrown outwardly across and between the active bearing faces of the cooperative fixed and movable bearing elements. The pivotal or tiltable arrangement of the portions or segments of the bearing element 23 is such as to produce wedge-shaped spaces at the forward edges of these bearing segments, thus gradually facilitating the development of pressure films of oil between and across the active bearing faces of these elements, the action being such as might well be described as a forcible floating or elevating of the upper bearing element above the lower bearing element by means of the film of oil under pressure.

During this operation of the apparatus described hereinabove, that is, with a plain sleeve 27 which is not provided with the deflector described hereinbelow, the oil in the space within the active bearing elements is swirling at a considerable velocity and, if this velocity is sufficient and the formation of the parts includes one or more projections against which the swirling oil strikes, this oil is agitated and splashed to such an extent as to be thrown upwardly through the space between the sleeve 27 and the rotatable bearing above the upper edge of the sleeve 27, whence at least a portion of this oil thus thrown upwardly, passes over to the inner side of the sleeve 27 and down along the shaft to the lower bearing or elsewhere; but in any case, this portion of the oil is lost from the upper bearing. Under certain conditions of operation, this loss of oil may be continuous, thus causing lowering of the level of the oil in the housing to a point such that the active bearing surfaces of the bearing elements are exposed above the level of the oil. Under these conditions, it will be apparent that enormous friction losses are present and destruction of at least the bearing faces of the bearing elements will result.

It may happen that, due to defects in the manufacture of parts of the bearing structure or to a deformation of certain parts during assembling or operation of the bearing, portions of the rotating element of the bearing are slightly eccentric with respect to the outer surface of the sleeve 27 so as to produce, during operation, something of the action of a rotary pump. Under these conditions of structural deformation, it may happen during operation of the shaft at relatively high speed, the pumping action is present to such an extent as to cause portions of the oil to splash over the upper end of the sleeve 27, with the undesirable results set forth above.

The construction disclosed in Fig. 1 includes means for preventing the above described loss of oil through splashing of the same over the upper edge of the sleeve 27. An annular recess at the lower side of the collar 15, indicated at 30, is of a size appreciably greater than the sleeve 27, and, as shown herein, exposes a portion of the upper side of the bearing element 17. An annular element or collar 31, in a single piece or in several sections, is disposed within this recess or space and is attached to the outer side of the sleeve 27 at its upper edge, the collar being preferably provided with a shoulder which rests upon the upper end of the sleeve, and detachable means, such as bolts or screws, are provided for detachably securing this annular member 31 in position. As indicated at 32, the lower face of the annular member 31 is inclined downwardly from the sleeve and extends outwardly, to a point suitably beyond the inner edge of the annular member 17, preferably so as to leave only such clearance between the member 31 and the collar 15 as will provide for proper operation of the rotatable element.

The upper surface of the bearing element 17 is provided with a plurality of radial grooves 34 which are substantially closed at the radially inner end, as indicated at 35, and extend outwardly into communication with the oil space within the housing 26.

Under normal operating conditions, oil that may be splashed upwardly impinges against the lower inclined face 32 of the annular member 31 and is deflected thereby so as to drop onto the projecting upper surface at the inner side of the bearing element 17, whence it is readily carried radially outward through the grooves 34, due to centrifugal force, to the space outside of the active bearing elements. It will be apparent that this construction prevents splashing of oil over the upper edge of the sleeve 27 to the space within the same.

The inner portion of the upper surface of the bearing element 17 may be provided with an annular collecting groove 36, as indicated, connecting the inner ends of the several radial grooves 34, so as to facilitate carrying away of any oil splashed upwardly and deflected by the annular member 31.

Figure 2:
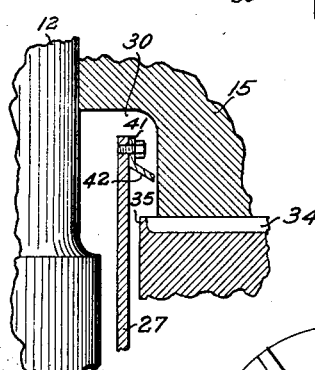
Fig. 2 is a broken sectional elevation showing a modification of a detail of construction shown in Fig. 1.
Figure 4:
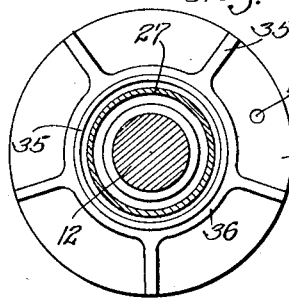
Fig. 4 is a horizontal sectional view of a portion of the bearing structure of Fig. 1, showing the upper surface of a rotatable bearing member.

In Fig. 2, there is shown a modified form of the annular element 31 disclosed in Fig. 1. In accordance with the disclosure of Fig. 2, the collar element 41 may be formed from sheet metal having a cylindrical portion fitting closely against the outer side of the sleeve 27 and a portion extending outwardly and downwardly from the under side of the cylindrical portion so as to provide a deflecting face 42 against which the oil strikes and by which the oil is deflected to the annular groove 36 and radial grooves 34 of the bearing element 17. It will be apparent that the operation of the modified construction of Fig. 2 is quite similar to that of Fig. 1.

Figure 3:
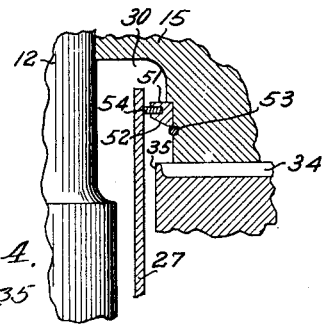
Fig. 3 is a view similar to Fig. 2, showing a further modification.

In the modified construction shown in Fig. 3, the annular deflector 51 is held in position against a shoulder on the side wall of the recessed portion of the collar 15, the element 51 being provided with an inclined deflecting face 52 at its under side and being held in position preferably by a spring ring 53 occupying a recess in the collar 15. A packing element 54 is held in position at the radially inner side of the collar 51, so as to make a relatively fluid tight joint between the rotating element 51 and the stationary sleeve 27. As has been described in connection with the operation of the devices of Figs. 1 and 2, oil which is splashed upwardly toward the top of the sleeve 27 during operation of the shaft, strikes the lower inclined face 52 of the annular element 51 and is deflected downwardly thereby to the annular groove 36 and thence to the radial grooves 34 of the bearing element 17.

It will be apparent that on removal of the portions of the thrust collar 15, the detachable deflector 31 can readily be removed from position on the sleeve 27, and then the parts of the bearing may be readily removed and replaced, as desired.

While certain reasons are given herein for the occurrence of agitation of splashing in the bearing housing on the inner side of the co-operative bearing elements, it is quite possible that these effects are due to one or more other causes; and the invention contemplates the provision of improved means for preventing oil from passing out of the housing, independently of the cause of the agitation or splashing of the oil.

It will be apparent that in all cases, a bearing construction is provided which includes means, preferably associated with the free end of the oil retaining dam or sleeve, effective to deflect any oil splashed upwardly during operation of the bearing, thus preventing undue loss of oil from the bearing housing and eliminating danger of lowering the oil level to a point which might be dangerous to the satisfactory operation or life of the bearing.

It should be understood that the invention claimed is not limited to the particular construction shown and described, for obvious modifications will be apparent to one skilled in the art.

It is claimed and desired to secure by Letters Patent:

1. A bearing for a vertical shaft, comprising cooperative, annular bearing elements, one of which is rotatable relative to another, a stationarily mounted, tubular oil-retaining dam disposed in position at the radially inner side of the active bearing portion of the rotatable bearing element, and means associated with said dam at a point above the active cooperative bearing surfaces of said bearing elements and operative during operation of said shaft and bearing to prevent the passage of lubricating material upwardly past the upper edge of said dam and to the radially inner side of said dam and to deflect said lubricating material outwardly therefrom, said rotatable bearing element being adapted to receive lubricating material deflected by said means and to discharge said lubricating material outwardly.

2. A bearing for a vertical shaft, comprising cooperative, stationary and rotatable, annular bearing elements, a tubular stationary dam disposed radially within the cooperative active bearing portions of said bearing elements, and an annular deflector associated with the exterior of said dam at a point above the cooperative bearing surfaces of said bearing elements, said deflector extending outwardly beyond the radially inner edge of the rotatable bearing element, and being removable from operative position with respect to said dam to permit removal in an upward direction of the rotatable bearing element.

3. A bearing for a vertical shaft, comprising co-operative bearing elements one of which is rotatable relative to another, a cylindrical, stationary oil-retaining dam disposed radially within said bearing elements, and an annular deflector associated with the exterior of said dam adjacent its upper edge, said deflector extending outwardly beyond the radially inner portions of said cooperative bearing elements, the rotatable bearing element being provided with means for conducting away oil deflected by said deflector.

4. A thrust bearing, comprising stationary and rotatable bearing elements having co-operative bearing portions, a stationary oil-retaining dam disposed radially within the co-operative bearing portions and spaced therefrom, and a deflector detachably associated with said dam adjacent the overflow point thereof, said deflector extending radially outward beyond the inner edge of the rotatable bearing element and adapted to deflect oil radially outward away from said dam.

5. A thrust bearing for a vertical shaft, comprising stationary and rotatable bearing elements having co-operative bearing portions, a stationary oil-retaining dam disposed radially within the co-operative bearing elements and spaced therefrom, a deflector associated with said dam above the co-operative bearing surfaces of said bearing elements and removable from operative position with respect to said dam, and means associated with said rotatable bearing element in position to receive oil from said deflecting means, and to conduct said oil away from said dam.

6. A thrust bearing for a vertical shaft, comprising stationary and rotatable bearing elements having co-operative bearing portions, one of said bearing elements having its bearing face in the form of a plurality of spaced segments, and a stationary oil-retaining dam disposed radially within the co-operative bearing elements and spaced therefrom, said dam being provided with a deflector located above the co-operative bearing faces of said bearing elements, said rotatable bearing element being provided with means for conducting away oil received from said deflector.

7. A thrust bearing for a vertical shaft, comprising stationary and rotatable bearing elements having co-operative bearing portions, one of said bearing elements including a plurality of spaced segmental parts at its bearing face, a stationary oil-retaining dam disposed radially within the co-operative bearing portions and spaced therefrom, and a deflector detachably mounted on said dam above the co-operative bearing surfaces of said bearing elements and extending radially outward beyond the inner edge of the rotatable bearing element, said rotatable bearing element being provided with means for conducting away from said deflector oil deflected on said bearing element by said deflector.

8. A thrust bearing for a vertical shaft, comprising stationary and rotatable bearing elements having co-operative bearing portions, one of said bearing elements having its bearing face in the form of a plurality of spaced segments, a stationary oil-retaining dam disposed radially within the co-operative bearing portions and spaced therefrom, and an annular deflector detachably mounted on said dam above the co-operative bearing faces of said bearing elements and having a downwardly inclined deflecting surface extending radially outward beyond the inner edge of the rotatable bearing element, said rotatable bearing element being provided with radial grooves adapted to receive oil from said deflector and to conduct said oil to the radially outer side of said bearing elements.

9. A thrust bearing for a vertical shaft, comprising a stationary bearing element, a thrust collar having a central recess at its lower side and detachably mounted on the shaft, a rotatable bearing element carried by said collar and having a portion co-operative with a bearing portion of said stationary bearing element, one of said bearing elements having its bearing face in the form of a plurality of spaced segments, a stationary oil-retaining dam of cylindrical form disposed radially within said bearing elements and extending upwardly into the recess in said thrust collar, and a deflector detachably mounted on said dam near its upper edge and within the recess in said collar, said deflector having its lower face inclined downwardly and extending radially outward beyond the inner edge of said rotatable bearing element, said rotatable bearing element having an annular groove adjacent its inner edge in position to receive oil from said deflector, and substantially radial grooves communicating with said annular groove and adapted to conduct oil from said annular groove to the space outside of said bearing elements.

In testimony whereof, the signature of the inventor is affixed hereto.

ROBERT B. WILLIAMSON.